US011797023B2

(12) United States Patent
Maeda

(10) Patent No.: US 11,797,023 B2
(45) Date of Patent: Oct. 24, 2023

(54) CONTROLLER, CONTROL METHOD, AND PROGRAM

(71) Applicant: SONY GROUP CORPORATION, Tokyo (JP)

(72) Inventor: Keisuke Maeda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 177 days.

(21) Appl. No.: 17/291,436

(22) PCT Filed: Nov. 25, 2019

(86) PCT No.: PCT/JP2019/046031
§ 371 (c)(1),
(2) Date: May 5, 2021

(87) PCT Pub. No.: WO2020/111012
PCT Pub. Date: Jun. 4, 2020

(65) Prior Publication Data
US 2022/0003569 A1  Jan. 6, 2022

(30) Foreign Application Priority Data

Nov. 30, 2018  (JP) ................................. 2018-224737

(51) Int. Cl.
*G05D 1/02* (2020.01)
*G01C 21/00* (2006.01)
(Continued)

(52) U.S. Cl.
CPC ....... *G05D 1/0274* (2013.01); *G01C 21/3837* (2020.08); *G01C 21/3881* (2020.08);
(Continued)

(58) Field of Classification Search
CPC .... G05D 1/0274; G05D 1/0223; G05D 1/101; G01C 21/3881; G01C 21/3837; G06V 20/17; G06V 20/10; G06V 20/13
See application file for complete search history.

(56) References Cited

U.S. PATENT DOCUMENTS 10,269,257 B1 *  4/2019  Gohl ..................... G06T 7/0002
2006/0025888 A1  2/2006  Gutmann
(Continued)

FOREIGN PATENT DOCUMENTS

CN   1388359 A   1/2003
CN   1839416 A   9/2006
(Continued)

OTHER PUBLICATIONS

Machine translation of the description of Kuga WO 2016158683 A1 (Year: 2023).*
(Continued)

*Primary Examiner* — Anne Marie Antonucci
*Assistant Examiner* — Jared C Bean
(74) *Attorney, Agent, or Firm* — Paratus Law Group, PLLC

(57) ABSTRACT

There is provided an information processing apparatus including circuitry configured to generate a map specification based on a behavior objective of a mobility device or a state of the mobility device, and create, based on the generated map specification, an outside map of an environment external to the mobility device that satisfies the generated map specification.

19 Claims, 11 Drawing Sheets

(51) Int. Cl.
*G05D 1/10* (2006.01)
*G06V 20/13* (2022.01)
*G06V 20/17* (2022.01)
*G06V 20/10* (2022.01)

(52) U.S. Cl.
CPC ........... *G05D 1/0223* (2013.01); *G05D 1/101* (2013.01); *G06V 20/10* (2022.01); *G06V 20/13* (2022.01); *G06V 20/17* (2022.01)

(56) References Cited

U.S. PATENT DOCUMENTS

| | | |
|---|---|---|
| 2010/0324769 A1 | 12/2010 | Takaoka |
| 2018/0225968 A1* | 8/2018 | Wang ..................... G01C 21/30 |
| 2018/0364045 A1* | 12/2018 | Williams ................ G01S 17/88 |
| 2019/0114798 A1* | 4/2019 | Afrouzi ..................... G06T 7/30 |
| 2019/0156566 A1* | 5/2019 | Chen ........................ G01S 17/89 |
| 2021/0181752 A1* | 6/2021 | Appelman ............. G01C 21/32 |

FOREIGN PATENT DOCUMENTS

| | | |
|---|---|---|
| CN | 108319655 A | 7/2018 |
| CN | 108801254 A | 11/2018 |
| JP | 2003-266349 A | 9/2003 |
| JP | 2008003979 A | 1/2008 |
| JP | 2010102485 A | 5/2010 |
| JP | 2017083919 A | 5/2017 |
| TW | 200842623 A | 11/2008 |
| WO | WO-2016158683 A1 * | 10/2016 ............. G01S 17/88 |

OTHER PUBLICATIONS

Cai Zixing: "Research on Environmental Cognition Theory and Methodology for Mobile Robots", Engineering Science and Technology II vol. 26, No. 1. Jan. 31, 2004, pp. 87-91, claims 1-20.

Gao Bo et al.: "Design of Mobile Robot Autonomous Return Control System Based on SLAM", Robot Technique and Application, No. 5, Oct. 15, 2017, pp. 20-26, claims 1-20.

* cited by examiner

CONTROLLER, CONTROL METHOD, AND PROGRAM

CROSS REFERENCE TO RELATED APPLICATIONS

This application is a National Stage Patent Application of PCT International Patent Application No. PCT/JP2019/046031 filed Nov. 25, 2019 under 35 U.S.C. § 371 which claims the benefit of Japanese Priority Patent Application JP 2018-224737 filed Nov. 30, 2018, the entire contents of which are incorporated herein by reference.

TECHNICAL FIELD

The present disclosure relates to a controller, a control method, and a program.

BACKGROUND ART

In general, a behavior plan for a robotic device is created using an outside map in order to achieve a behavior objective. Specifically, when a robotic device moves to a specified destination, a graph search algorithm such as the Dijkstra's algorithm or the A* algorithm is applied to search for an optimal movement route using an outside map, so as to create a behavior plan for the robotic device.

Here, an outside map used to create a behavior plan is created, for example, using environment information acquired by a sensor provided in a robotic device. The outside map can describe the outside more accurately if it has a larger region or has a higher resolution.

Thus, it is possible to create a more accurate behavior plan for a robotic device by using an outside map having a larger region and having a higher resolution. However, with respect to the outside map having a larger region and having a higher resolution, a data amount, and a calculation amount for performing a search are large, which results in increasing a load imposed when a route search is performed.

For example, Patent Literature 1 described below discloses only maintaining an outside map of a region around a robotic device itself, in order to prevent a continuous expansion of a region of an outside map and to prevent a continuous increase in a data amount of the outside map.

CITATION LIST

Patent Literature

PTL 1: Japanese Patent Application Laid-open No. 2003-266349

SUMMARY

Technical Problem

However, the technology disclosed in Patent Literature 1 described above makes it possible to prevent an increase in a data amount of an outside map, but it is difficult to perform a search for a route to a destination situated far away from a robotic device since the outside map is created with respect to a region around the robotic device.

Further, it is difficult to uniquely set the size of a region of an outside map and the level of a resolution of the outside map since there is a trade-off relationship between the accuracy of a behavior plan created using the outside map, and a data amount of and a calculation amount for the outside map.

Thus, there has been a need for a technology that makes it possible to create an outside map sufficient to create a behavior plan while reducing a data amount of and a calculation amount for the outside map.

Solution to Problem

According to an aspect of the present disclosure, there is provided an information processing apparatus including circuitry configured to generate a map specification based on a behavior objective of a mobility device or a state of the mobility device, and create, based on the generated map specification, an outside map of an environment external to the mobility device that satisfies the generated map specification.

According to another aspect of the present disclosure, there is provided an information processing method including generating a map specification based on a behavior objective of a mobility device or a state of the mobility device, and creating, based on the generated map specification, an outside map of an environment external to the mobility device that satisfies the generated map specification.

According to another aspect of the present disclosure, there is provided a non-transitory computer-readable recoding medium having embodied thereon a program, which when executed by a computer causes the computer to execute a method, the method including generating a map specification based on a behavior objective of a mobility device or a state of the mobility device, and creating, based on the generated map specification, an outside map of an environment external to the mobility device that satisfies the generated map specification.

DESCRIPTION OF EMBODIMENTS

Embodiments of the present disclosure will now be described below with reference to the drawings. Note that, in the specification and the drawings of the present disclosure, elements having substantially the same functional configuration are denoted by the same reference symbols and redundant descriptions are omitted.

Note that the descriptions are given in the following order.
1. Outline of Technology According to Present Disclosure
2. Example of Configuration of Controller
3. Example of Operation of Controller
4. Modification
5. Example of Configuration of Hardware
6. Summary <1. Outline of Technology According to Present Disclosure>

Figure 1A:
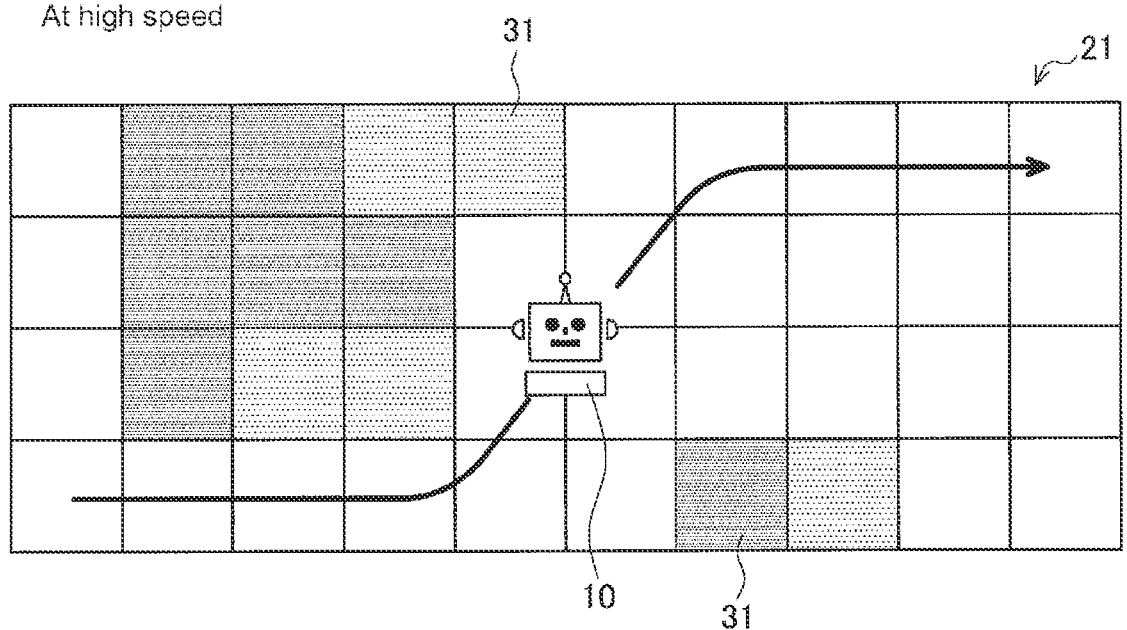
FIG. 1A illustrates an example of a relationship between a behavior performed by a robotic device and specifications of an outside map.
Figure 1B:
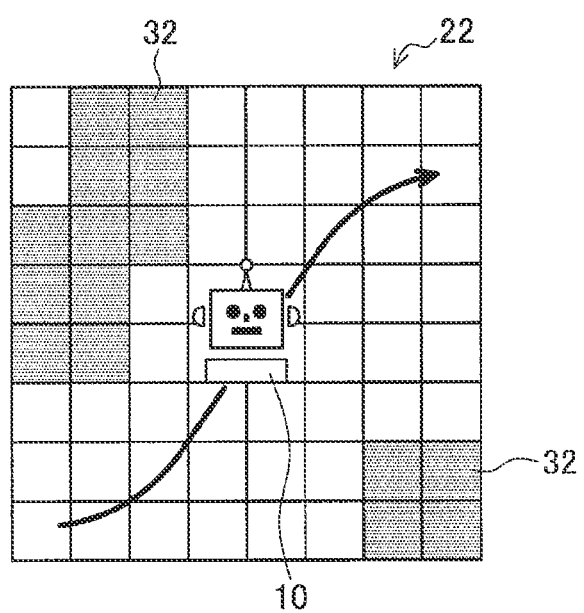
FIG. 1B illustrates an example of the relationship between a behavior performed by the robotic device and specifications of an outside map.

First, a background of the technology according to an aspect the present disclosure is described with reference to FIGS. 1A and 1B. FIGS. 1A and 1B illustrate examples of a relationship between a behavior performed by a robotic device and specifications of an outside map.

A movement of a robotic device is described below as an example of a behavior of a robotic device, but the technology according to an aspect of the present disclosure is not limited to the examples indicated below. The technology according to an aspect of the present disclosure is also applicable to various behaviors of a robotic device other than its movement.

As illustrated in FIGS. 1A and 1B, when a robotic device 10 performs a behavior of moving to a specified destination, first, the robotic device 10 creates an outside map 21, 22 (for example, a grid map) that is two-dimensional matrix data, using outside-environment information. The application of a graph search algorithm such as the Dijkstra's algorithm or the A* algorithm to the created outside map 21, 22 enables the robotic device 10 to determine an optimal route to the destination.

Specifically, on the created outside map 21, 22, a grid square in which an obstacle has been observed using, for example, a sensor is determined to be an obstacle region 31, 32, for which the existence probability of an obstacle is set high. Further, a grid square in which an obstacle has not been observed is determined to be a movable-over region, for which the existence probability of an obstacle is set low. Note that, with respect to the obstacle region 31, 32, the level of the existence probability of an obstacle may be set according to the number of obstacles existing in a grid square or the size of an obstacle existing in a grid square (in FIG. 1A, it is shown by shading using dot hatching).

Next, in order to take into consideration a factor of safety against collision and the size of the robotic device 10, an expansion process of expanding a region of the obstacle region 31, 32 of the outside map 21, 22, is performed. After that, the application of a graph search algorithm to the outside map 21, 22 after the expansion process is performed enables the robotic device 10 to determine an optimal route to avoid the obstacle region 31, 32.

However, in general, suitable specifications of an outside map used to create a behavior plan for the robotic device 10 differ depending on what behavior the robotic device 10 performs.

Specifically, as illustrated in FIG. 1A, when the robotic device 10 moves at a high speed, the outside map 21 having a larger region and having a lower resolution is more suitable. The reason is that the use of an outside map having a larger region makes it possible to efficiently create a behavior plan for moving a long distance, since the robotic device 10 moving at a high speed moves farther in a short time. Further, the reason is that it is possible to obtain a high factor of safety by using the outside map 21 having a lower resolution and by estimating the size of the obstacle region 31 to be larger, since it is difficult to control, with a high degree of accuracy, a movement route or a pose of the robotic device 10 moving at a high speed.

On the other hand, as illustrated in FIG. 1B, when the robotic device 10 moves at a low speed, the outside map 22 having a smaller region and having a higher resolution is more suitable. The reason is that the use of the outside map 22 having a smaller region makes it possible to reduce an amount of a calculation to be performed to create a behavior plan, since the robotic device 10 moving at a low speed only moves a short distance. Further, the reason is that the use of the outside map 22 having a higher resolution enables the robotic device 10 to pass, through an accurate route and in an accurate pose, a region in which many obstacle regions 32 exist, since it is possible to control, with a high degree of accuracy, a movement route or a pose of the robotic device 10 moving at a low speed.

As described above, an outside map suitable to create a behavior plan for the robotic device 10 may differ depending on the content of a behavior performed by the robotic device 10. Thus, when map specifications such as the size of a region of an outside map and the resolution of the outside map remain unchanged, there is a possibility that the robotic device 10 will create, depending on a behavior objective, an outside map having a region with a low degree of necessity or an outside map having a higher-than-necessary resolution. Thus, when map specifications of an outside map remain unchanged, it is difficult to improve the efficiency in a creation of a behavior plan for the robotic device 10.

The technology according to an aspect of the present disclosure has been conceived in view of the circumstances described above. The technology according to an aspect of the present disclosure makes it possible to more efficiently create an outside map and a behavior plan for the robotic device 10 by changing map specifications of the outside map according to a behavior objective of the robotic device 10.

Figure 2:
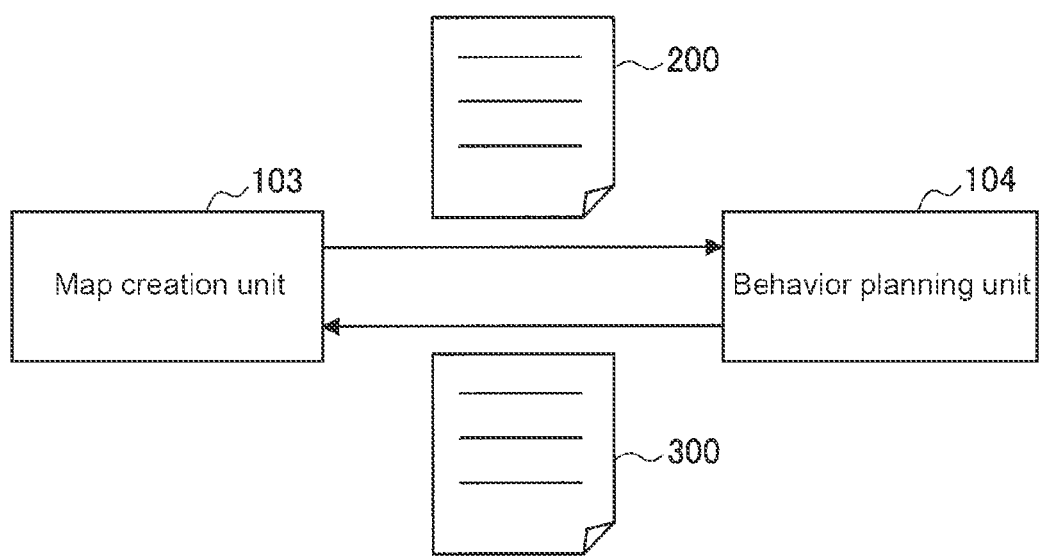
FIG. 2 is a schematic diagram illustrating an outline of a technology according to an embodiment of the present disclosure.

Next, an outline of the technology according to an aspect of the present disclosure is described with reference to FIG. 2. FIG. 2 is a schematic diagram illustrating an outline of the technology according to an aspect of the present disclosure.

As illustrated in FIG. 2, the technology according to an aspect of the present disclosure includes a behavior planning unit 104 that creates a behavior plan using an outside map 200, and a map creation unit 103 that creates the outside map 200, in which the behavior planning unit 104 provides the map creation unit 103 with feedback of map specifications 300 depending on a behavior objective. This enables the behavior planning unit 104 to make a request for the map creation unit 103 to create an outside map of specifications suitable for a behavior plan to be created, and thus it is possible to create a behavior plan more efficiently using an outside map suitable for a behavior objective.

The technology according to an aspect of the present disclosure whose outline has been described above, is more specifically described below.

<2. Example of Configuration of Controller>

Figure 3:
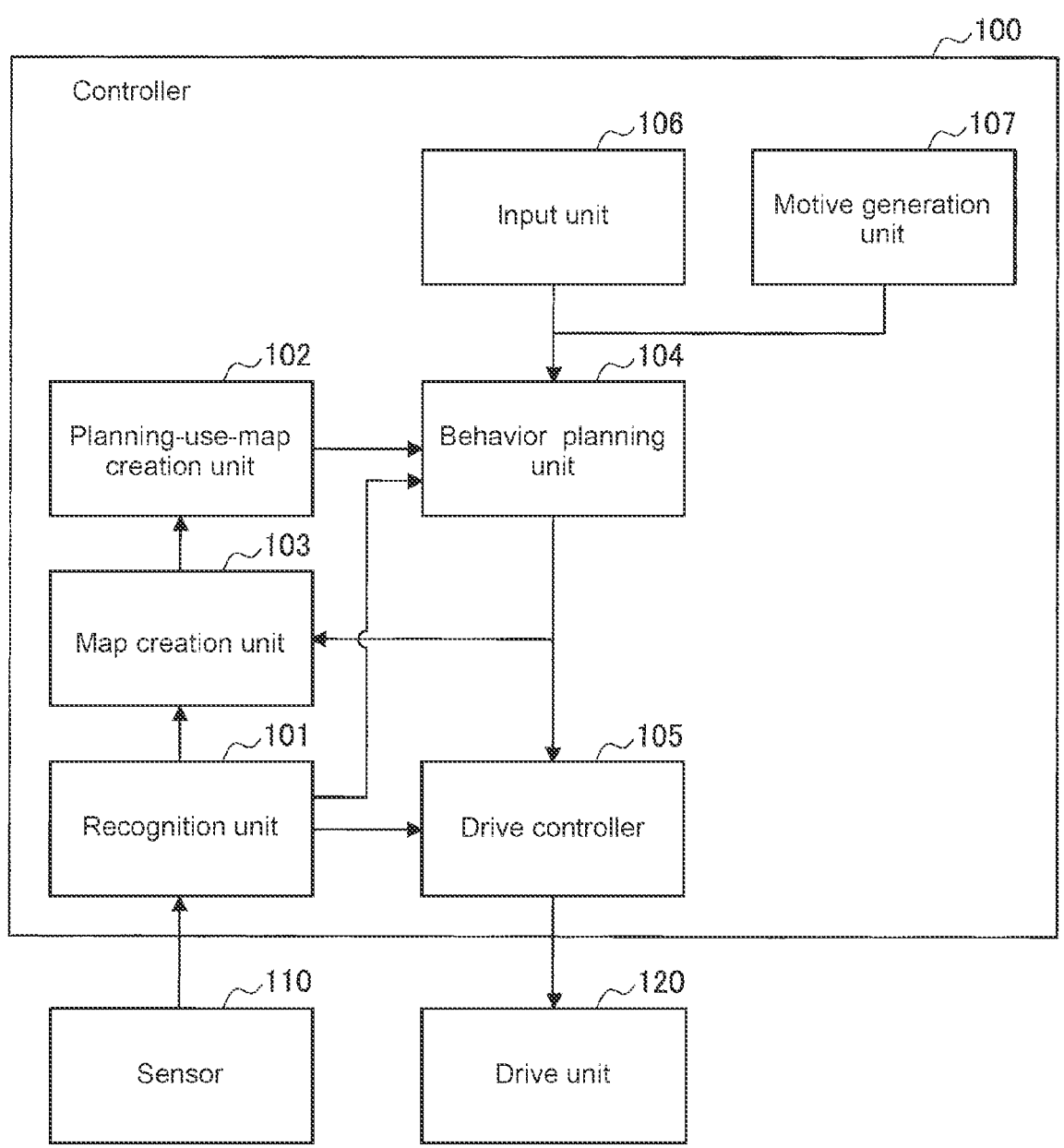
FIG. 3 is a block diagram of a functional configuration of a controller according to an embodiment of the present disclosure.

First, an example of a configuration of a controller 100 according to an embodiment of the present disclosure is described with reference to FIG. 3. FIG. 3 is a block diagram of a functional configuration of the controller 100 according to an embodiment of the present disclosure.

As illustrated in FIG. 3, the controller 100 is a controller that controls the behavior of the robotic device 10 by controlling a drive unit 120 according to environment information acquired using a sensor 110. For example, the controller 100 includes a recognition unit 101, the map creation unit 103, a planning-use-map creation unit 102, the behavior planning unit 104, an input unit 106, a motive generation unit 107, and a drive controller 105.

Note that the controller 100 may be provided within the robotic device 10 together with the sensor 110 and the drive unit 120. Alternatively, the controller 100 may be provided outside the robotic device 10 and may transmit/receive information to/from the robotic device 10 through, for example, a network.

Examples of the sensor 110 include various sensors, and the sensor 110 observes a state of the outside to acquire outside-environment information, or observes a state of the robotic device 10 to acquire information regarding the robotic device 10. For example, regarding a sensor that observes a state of the outside to acquire environment information, various cameras such as an RGB camera, a grayscale camera, a stereo camera, a depth camera, an infrared camera, and a ToF (Time of Flight) camera may be included as examples of the sensor 110, and various range sensors such as a LIDAR (Laser Imaging Detection and Ranging) sensor and a RADAR (Radio Detecting and Ranging) sensor may be included as examples of the sensor 110. Further, regarding a sensor that observes a state of the robotic device 10 to acquire information regarding the robotic device 10, an encoder, a voltmeter, an ammeter, a strain gauge, a manometer, an IMU (Inertial Measurement Unit), a thermometer, and a hygrometer may be included as examples of the sensor 110.

However, it is needless to say that a known sensor other than the sensors described above may be included as an example of the sensor 110 if it is possible to observe a state of the outside or a state of the robotic device 10 using the sensor 110.

The recognition unit 101 recognizes a state of the outside using environment information acquired by the sensor 110 or a state of the robotic device 10 using information regarding the device acquired by the sensor 110. Specifically, the recognition unit 101 may recognize an outside state by performing, using environment information acquired by the sensor 110, an obstacle recognition, a form recognition (that is, a wall recognition or a floor recognition), an object recognition, a maker recognition, a letter recognition, a white-line or lane recognition, or a sound recognition.

Further, the recognition unit 101 may recognize a state of the robotic device 10 by performing, using information regarding the device acquired by the sensor 110, a position recognition, a recognition of a motion state (such as velocity, acceleration, or jerk), or a state of a device body (such as a remaining power source, a temperature, or a joint angle). Examples of the state of the robotic device 10 recognized by the recognition unit 101 may include a position state, a motion state (in particular, the nth-order derivative of, for example, velocity, acceleration, or jerk regarding a position, and the nth-order derivative of, for example, angular velocity or angular acceleration regarding a pose), a battery state, and a failure state of the robotic device 10.

The recognitions described above performed by the recognition unit 101 can be performed using a known recognition technology. A recognition performed by the recognition unit 101 may be performed, for example, in accordance with a specified rule or using a machine learning algorithm.

The map creation unit 103 creates an outside map using outside information that is a result of the recognition unit 101 recognizing the outside. Note that the map creation unit 103 may further include functions of the recognition unit 101 and a planning-use-map creation unit described later.

For example, the map creation unit 103 may create an obstacle map or a movement region map that indicates a region which the robotic device 10 can pass, or may create an object map that indicates positions at which various objects exist, or may create a topology map that indicates a name of a region, a relationship between respective regions, or the meaning of a region. More specifically, the map creation unit 103 may create a map for movement that shows a movable-across region or an obstacle region, and costs for a movement across each region, or may create an object map that shows a name, a position, and a form of an object or a location, as well as a region in which the object or the location exists, or a topology map that shows a connection between locations and a passage direction, or may create a road map that shows, for example, a position of a region of a road that connects a location to another location, a width of the road, an inclination of the road, and a curvature of the road. The map creation unit 103 may create a plurality of different types of outside maps according to the usage, a type, or a condition.

In the controller 100 according to an embodiment of the present disclosure, the map creation unit 103 creates an outside map using map specifications output from the behavior planning unit 104. Specifically, the map creation unit 103 creates an outside map by combining a local map obtained by converting a previously created outside map such that map specifications are satisfied, and a local map created using a result of recognizing the outside such that the map specifications are satisfied.

For example, when the state or the behavior objective of the robotic device 10 has changed, map specifications output from the behavior planning unit 104 may be changed since a behavior plan created by the behavior planning unit 104 may change. In such a case, the map creation unit 103 creates an output map after an update, by combining a local map obtained by changing an output map before the update such that map specifications after the update are satisfied, and a local map created using a new result of recognizing the outside such that the map specifications after the update are satisfied. Note that, when an output map before an update satisfies map specifications after the update, the map creation unit 103 may maintain the outside map before the update without updating the outside map.

The creation of an outside map performed by the map creation unit 103 using map specifications will be described later in detail in <3. Example of Operation of Controller>.

The planning-use-map creation unit 102 creates a map for behavior plan using an outside map created by the map creation unit 103 and information regarding the robotic device 10, with information necessary to create a behavior plan for the robotic device 10 being embedded in the map for behavior plan. Specifically, the planninguse-map creation unit 102 determines what a region and an object included in an outside map each mean with respect to the robotic device 10, and creates a map for behavior plan in which each determined meaning is embedded.

For example, when the robotic device 10 is a wheeled robotic device, the planninguse-map creation unit 102 can set, to be impassable regions, a puddle and a pit that exist on the surface of the ground on an outside map. Further, when the robotic device 10 is a flight vehicle such as a drone, the planning-use-map creation unit 102 can set, to be a passable region, an obstacle that exists at a level lower than an altitude at which the robotic device 10 can fly. Furthermore, when the robotic device 10 is a waterproof leg-type robotic device, the planning-use-map creation unit 102 can set, to be passable regions, a puddle and a pit that exist on the surface of the ground on an outside map.

As described above, the planning-use-map creation unit 102 can create a map for behavior plan by adding, to an outside map, an evaluation depending on the properties of a body and a behavior of the robotic device 10. Note that the planning-use-map creation unit 102 may create a plurality of different types of maps according to the usage, a type, or a condition.

The input unit 106 outputs a behavior objective of the robotic device 10 according to an input from a user. For example, when a movement destination is input by a user, the input unit 106 may output, as a behavior objective, the behavior objective regarding the content of "movement to destination". The input unit 106 may include an input device, such as a touch panel, a keyboard, a mouse, a button, a microphone, a switch, or a lever, that is used by a user to input information, and an input control circuit that generates an input signal using the input information.

Note that the robotic device 10 may further include a display unit used to provide a user with information. For example, the display unit can indicate to a user a behavior that can be performed, and indicate to a user an image such as a map used to set a behavior objective. This enables a user to provide the robotic device 10 with a more appropriate behavior objective.

The motive generation unit 107 automatically generates a behavior objective of the robotic device 10, and outputs the generated behavior objective. Specifically, without using an input from the outside or outside-environment information, the motive generation unit 107 autonomously generates a behavior objective using, for example, a time or a behavioral history in the past.

It is possible to cause the behavior planning unit 104 to start creating a behavior plan by the behavior objective generated by the input unit 106 and the motive generation unit 107 being output to the behavior planning unit 104. For example, a combination of a time, a location, and a motion state of the robotic device 10, as well as a name of a target and a relative distance from the target to be maintained, may be output to the behavior planning unit 104 as a behavior objective regarding "movement to destination".

The behavior planning unit 104 creates a behavior plan to achieve a behavior objective, using a map for behavior plan created by the planning-use-map creation unit 102 and a state of the device recognized by the recognition unit 101. Specifically, the behavior planning unit 104 creates a behavior plan to achieve a behavior objective input by the input unit 106 or the motive generation unit 107, by searching in a map for behavior plan, with a current state of the device being used as a start state.

Figure 4:
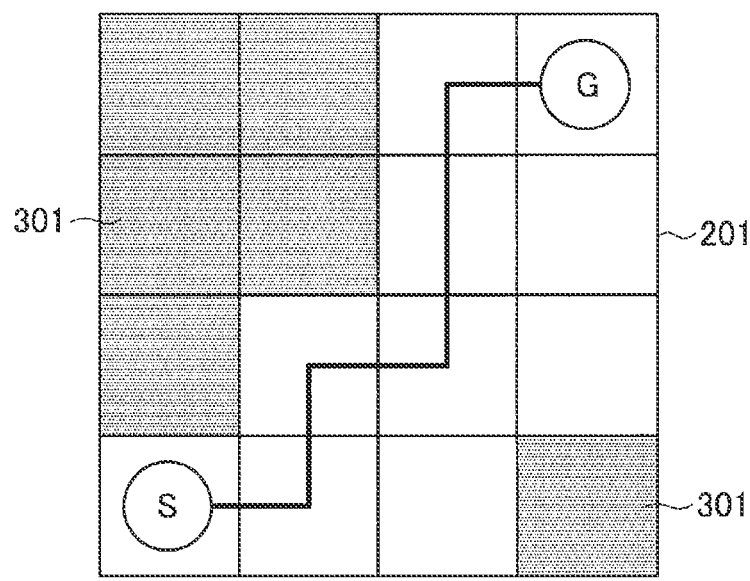
FIG. 4 is a schematic diagram for explaining an example of a behavior plan created by a behavior planning unit.

For example, the behavior planning unit 104 may create a behavior plan using a grid map as illustrated in FIG. 4. FIG. 4 is a schematic diagram for explaining an example of a behavior plan created by the behavior planning unit 104.

Consider the case in which an outside map is a grid map 201 in which an obstacle region 301 is set, and the behavior planning unit 104 creates a behavior plan for moving from a grid square S to a grid square G, as illustrated in FIG. 4. Here, first, the behavior planning unit 104 considers that the grid map 201 has a graph structure in which each grid square is a node and a connection between adjacent nodes is an edge, and applies a graph search algorithm to the graph structure. This enables the behavior planning unit 104 to find a shortest route from the grid square S corresponding to a position of the device to the grid square G corresponding to a target position. After that, the behavior planning unit 104 can create a behavior plan in a real space by replacing a coordinate system of the found short route by a coordinate system in the real space.

The behavior planning unit 104 may create a behavior plan that has a structure with stages of, for example, a behavior strategy, a long-term behavior, and a short-term behavior, or may create a plurality of behavior plans implemented in parallel. For example, the behavior planning unit 104 may create a topological route plan using a wide-area topological map, a coordinate route plan using an obstacle in an observation range, or a motion plan including dynamics executed by the robotic device 10.

In the controller 100 according to the an embodiment of the present disclosure, the behavior planning unit 104 further creates map specifications using the content of a behavior to be planned, and outputs the created map specifications to the map creation unit 103. Specifically, the behavior planning unit 104 creates map specifications of an outside map using at least one of a behavior objective or a state of the device, and outputs the created map specifications to the map creation unit 103. Further, when one of a behavior objective and a state of the device has been changed, the behavior planning unit 104 updates map specifications using a new behavior objective or a new state of the device, and outputs the updated map specifications to the map creation unit 103.

Note that, when an input outside map (or a map for behavior plan to which an evaluation in the robotic device 10 has been added) does not satisfy map specifications, the behavior planning unit 104 may provide the map creation unit 103 with feedback reporting that the outside map does not satisfy the map specifications.

For example, the map specifications created by the behavior planning unit 104 may specify at least one of a region necessary for an outside map (or a map for behavior plan to which an evaluation in the robotic device 10 has been added), or a resolution necessary for the outside map. For example, a point included in a region of an outside map, a distance to an outer edge of a region of an outside map, the shape of a region of an outside map (such as polygonal, circular, three-dimensional, or spherical), or a location included in a region of an outside map (such as an area, a room, a building, or a community) may be specified as specifications of a region. For example, the size of a grid square in a grid map, the unit of a coordinate of an outside map, or the conceptional level of a region included in an outside map may be specified as specifications of a resolution.

For example, the behavior planning unit 104 may specify a region of an outside map such that a position of the device in a state of the device and a movement destination in a behavior objective are included. More specifically, the behavior planning unit 104 may specify, as a region of an outside map, a cuboid region in which a position of the device and a movement destination are situated diagonally opposite from each other, or may specify, as a region of an outside map, a region obtained by adding a certain margin to the cuboid region.

For example, the behavior planning unit 104 may specify a resolution of an outside map according to the size of a region of a map. More specifically, the behavior planning unit 104 may specify, as a resolution of an outside map, the square root of a value obtained by dividing a region of a two-dimensional outside map by a constant, or the cubic root of a value obtained by dividing a region of a three-dimensional outside map by a constant. Alternatively, the behavior planning unit 104 may specify the resolution of an outside map according to the accuracy of a position in a behavior objective. Further, the behavior planning unit 104 may specify the resolution of an outside map according to a movement speed in a behavior objective. More specifically, the behavior planning unit 104 may specify, as a resolution of an outside map, a value obtained by adding a constant to a movement speed.

Further, map specifications created by the behavior planning unit 104 may specify specifications of outside information used to create an outside map. Specifically, the map specifications created by the behavior planning unit 104 may specify a threshold indicating a timing of acquiring outside information used to create an outside map. This enables the behavior planning unit 104 to instruct the map creation unit 103 to not use certain outside information to create an outside map, in which a period of time equal to or more than the threshold has elapsed since acquisition of the certain outside information.

In addition, the map specifications created by the behavior planning unit 104 may specify specifications of a representation of, for example, an obstacle on a map. Specifically, the map specifications created by the behavior planning unit 104 may specify which of two values including 0 and 1, and the probability is to be used to represent the existence of an obstacle on a map.

Using a behavior plan created by the behavior planning unit 104 and a state of the robotic device 10, the drive controller 105 outputs, to the drive unit 120, a control command that gives an instruction to perform a behavior in conformity with the behavior plan. Specifically, the drive controller 105 may calculate an error between a state planned in the behavior plan and a current state of the robotic device 10, and may output, to the drive unit 120, a control command that gives an instruction to reduce the calculated error. Further, the drive controller 105 may generate, in stages, a control command output to the drive unit 120.

The drive unit 120 causes the robotic device 10 to perform a planned behavior by performing driving in accordance with a control command from the drive controller 105. For example, the drive unit 120 is a module that performs output to a real space, and may be, for example, an engine, a motor, a speaker, a projector, a display, or a light emission device (such as a light bulb, an LED, or a laser).

The configuration described above enables the controller 100 to create a behavior plan using an outside map created using map specifications provided by the behavior planning unit 104. This enables the controller 100 to create a behavior plan using an outside map more appropriate for a created behavior plan, and thus it becomes possible to control the robotic device 10 more efficiently.

Figure 5:
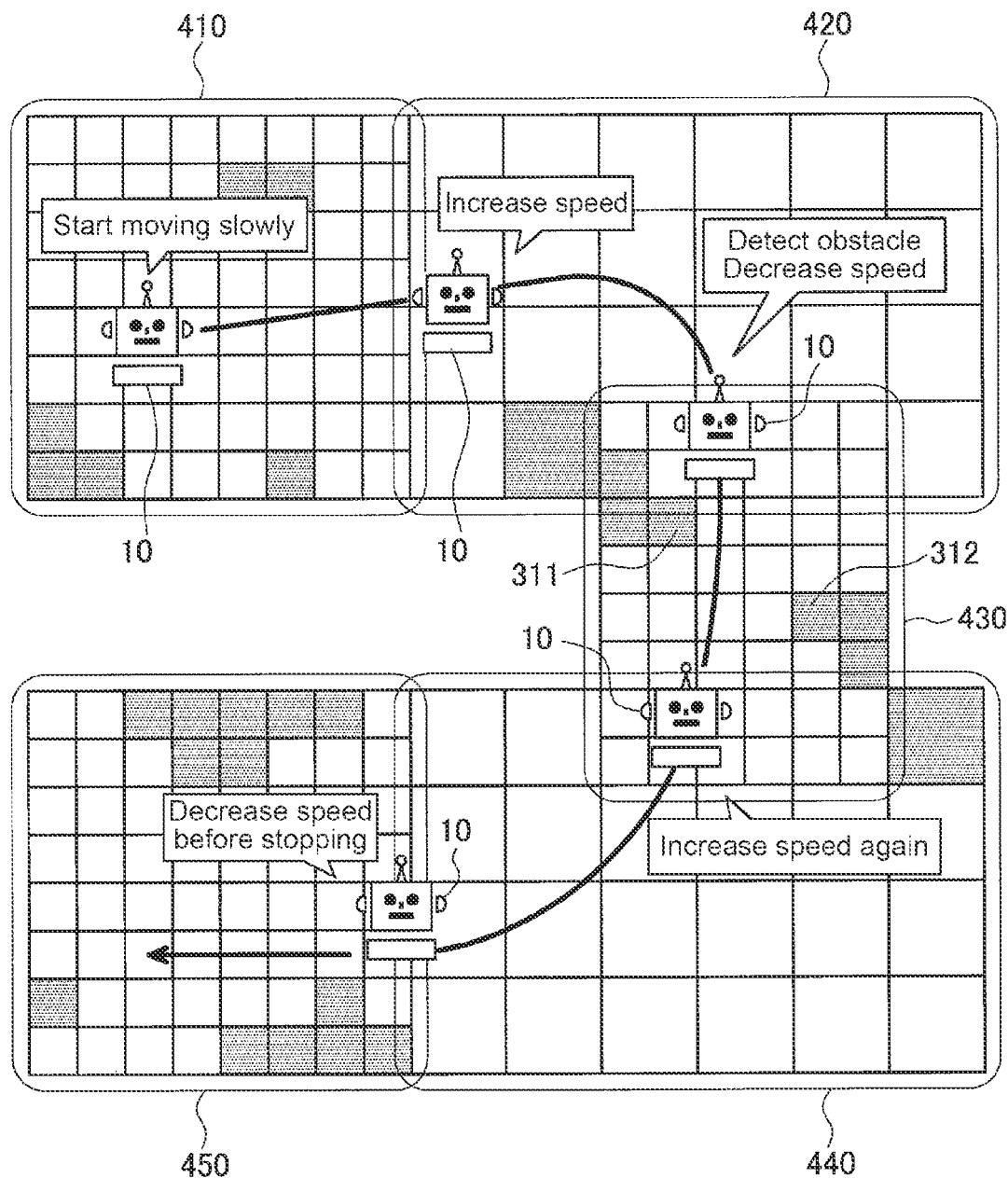
FIG. 5 illustrates an example of a control of the robotic device performed by the controller according to an embodiment of the present disclosure.

Here, a specific example of a control of the robotic device 10 performed by the controller 100 according to an embodiment of the present disclosure is described with reference to FIG. 5. FIG. 5 illustrates an example of a control of the robotic device 10 performed by the controller 100 according to an embodiment of the present disclosure.

For example, since the movement speed of the robotic device 10 is low when the robotic device 10 starts moving (the state on the upper left in FIG. 5), as illustrated in FIG. 5, an outside map having a small region and having high resolution is desired. Thus, the map creation unit 103 creates an outside map 410 having a small region and having high resolution such that desired map specifications are satisfied. This makes it possible to control a position and a pose of the robotic device 10 more carefully with a higher degree of accuracy when the robotic device 10 starts moving.

Next, since the movement speed of the robotic device 10 is high when the robotic device 10 increases the movement speed (the state on the upper right in FIG. 5), an outside map having a large region and having low resolution is desired. Thus, the map creation unit 103 creates an outside map 420 having a large region and having low resolution such that desired map specifications are satisfied. This enables the robotic device 10 to move efficiently at a high speed in a region in which, for example, an obstacle does not exist.

After that, since there is a need to control a position and a pose of the robotic device 10 with a higher degree of accuracy when the robotic device 10 detects an obstacle 311, 312 (the state in the middle on the right in FIG. 5), an outside map having a small region and having high resolution is desired. Thus, the map creation unit 103 creates an outside map 430 having a small region and having high resolution such that desired map specifications are satisfied. This makes it possible to control the position and the pose of the robotic device 10 more carefully with a higher degree of accuracy, in order for the robotic device 10 to avoid the obstacles 311 and 312.

Next, since the robotic device 10 increases the movement speed again after the robotic device 10 avoids the obstacles 311 and 312, an outside map having a large region and having low resolution is desired again at this timing (the state on the lower right in FIG. 5). Thus, the map creation unit 103 creates an outside map 440 having a large region and having low resolution such that desired map specifications are satisfied. This enables the robotic device 10 to move efficiently at a high speed in a region in which, for example, the obstacle 311, 312 does not exist.

Next, since there is a need to control a stop position of the robotic device 10 when the robotic device 10 stops (the state on the lower left in FIG. 5), an outside map having a small region and having high resolution is desired. Thus, the map creation unit 103 creates an outside map 450 having a small region and having high resolution such that desired map specifications are satisfied. This makes it possible to control the stop position of the robotic device 10 with a higher degree of accuracy.

As can be seen from FIG. 5, since the controller 100 according to an embodiment of the present disclosure is capable of creating an outside map of appropriate specifications based on the content of a behavior performed by the robotic device 10, it is possible to control the behavior of the robotic device 10 more efficiently and more appropriately.

<3. Example of Operation of Controller>

Next, an example of an operation of the controller 100 according to an embodiment of the present disclosure is described with reference to FIGS. 6 to 9.

Figure 6:
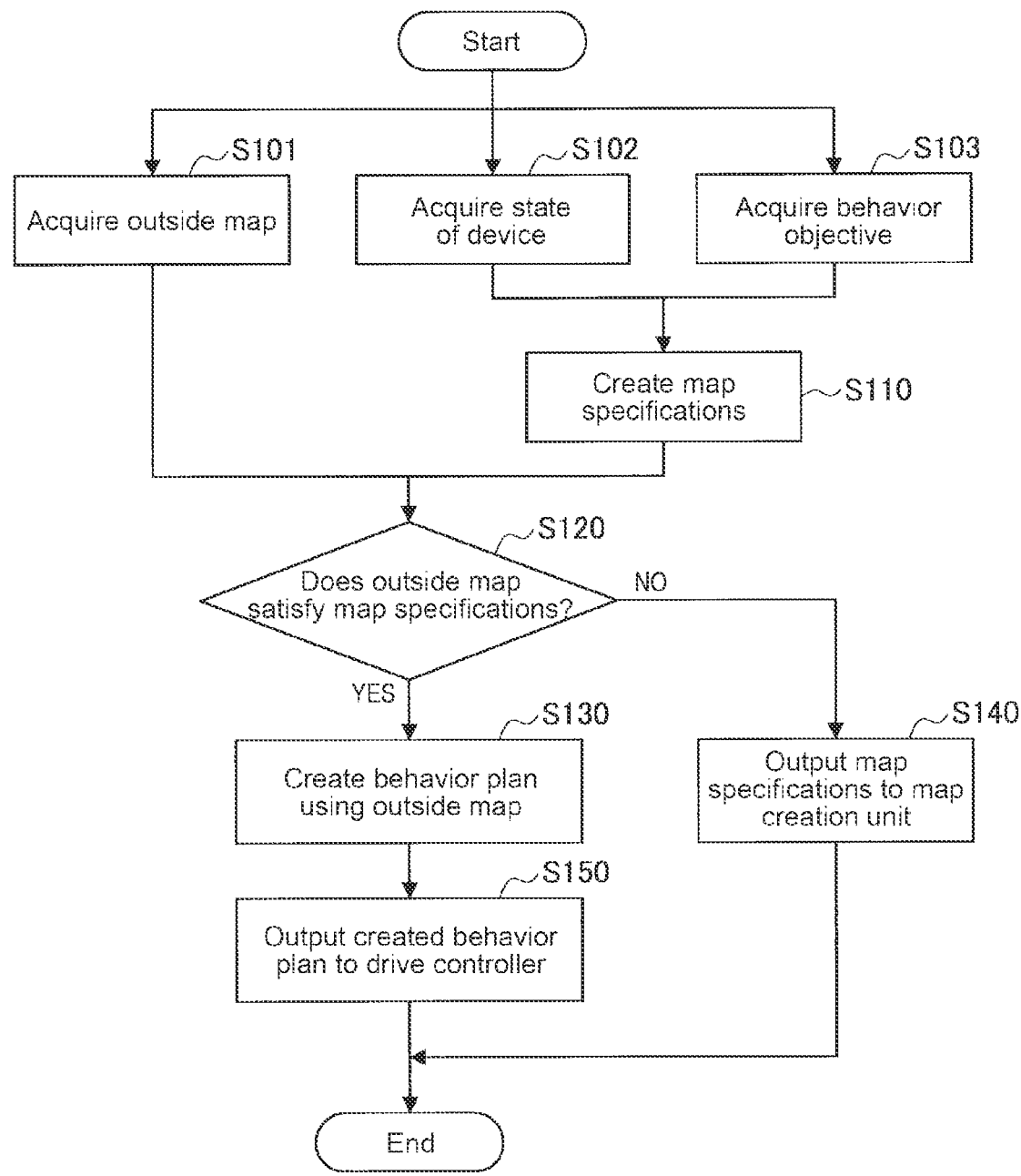
FIG. 6 is a flowchart illustrating an example of how the behavior planning unit creates a behavior plan.

First, how the behavior planning unit 104 creates a behavior plan is described with reference to FIG. 6. FIG. 6 is a flowchart illustrating an example of how the behavior planning unit 104 creates a behavior plan.

As illustrated in FIG. 6, the behavior planning unit 104 acquires a previously created outside map from the planning-use-map creation unit 102 or the map creation unit 103 (S101). Further, the behavior planning unit 104 acquires a state of the robotic device 10 from the recognition unit 101 (S102), and acquires a behavior objective of the robotic device 10 from the input unit 106 or the motive generation unit 107 (S103). Note that the operations of Steps S101 to S103 may be performed at the same time or in parallel.

Further, using the acquired state and the acquired behavior objective of the robotic device 10, the behavior planning unit 104 creates map specifications of an outside map that are suitable for the content of a behavior plan to be created (S110).

Next, the behavior planning unit 104 determines whether the previously created outside map satisfies the map specifications created in Step S110 (S120). When the previously created outside map satisfies the map specifications (S120/Yes), the behavior planning unit 104 creates a behavior plan using the previously created outside map (S130), and outputs the created behavior plan to the drive controller 105 (S150).

On the other hand, when the previously created outside map does not satisfy the map specifications (S120/No), the behavior planning unit 104 outputs the map specifications created in Step S110 to the map creation unit 103 (S140) to make a request to create an outside map based on the updated map specifications.

Figure 7:
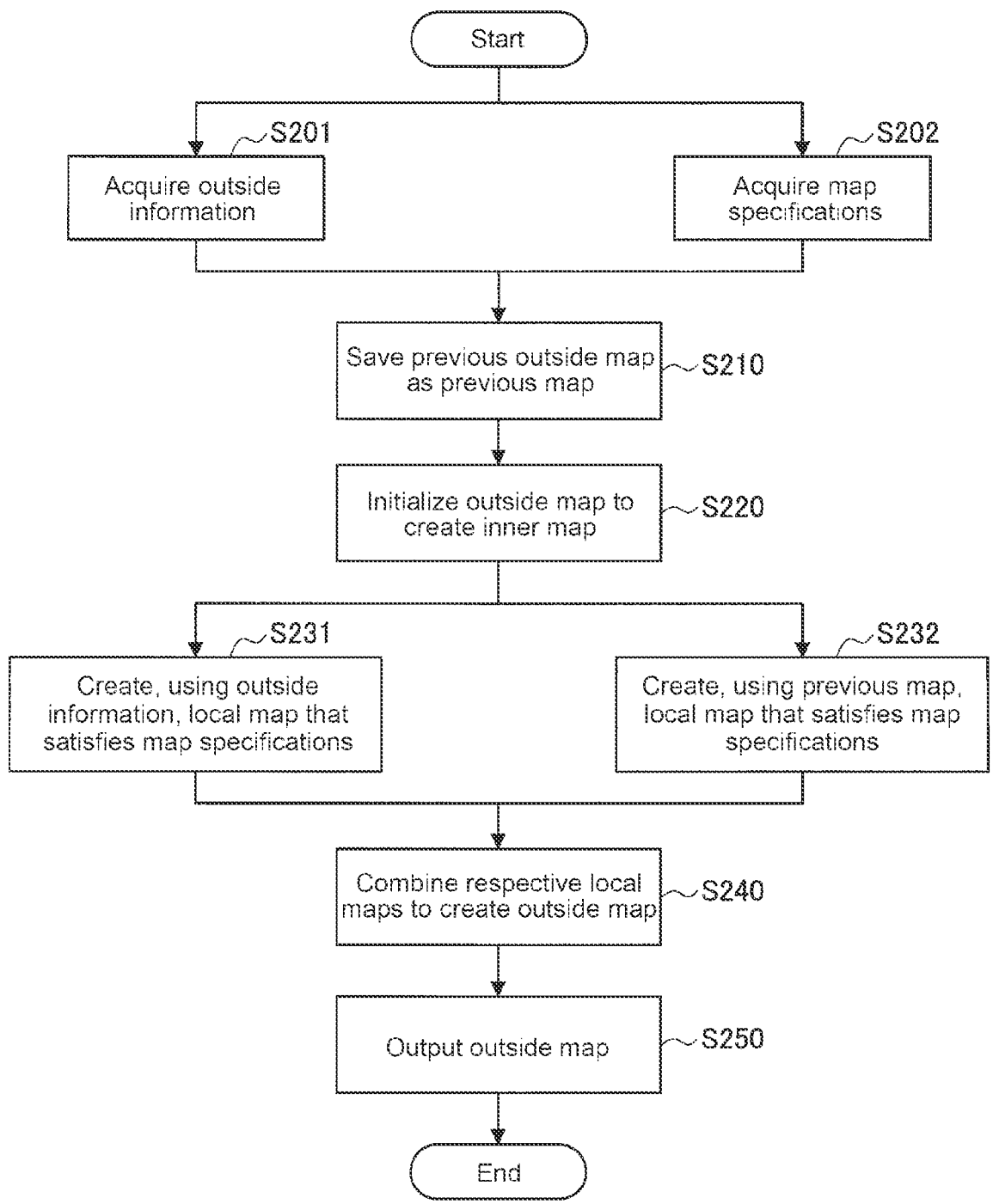
FIG. 7 is a flowchart illustrating an example of an operation of a creation of an outside map performed by a map creation unit.

Next, how the map creation unit 103 creates an outside map using the map specifications updated by the behavior planning unit 104 is described with reference to FIGS. 7 to 9. FIG. 7 is a flowchart illustrating an example of how the map creation unit 103 creates an outside map, and FIGS. 8 and 9 are illustrations explaining the details of a creation of an outside map performed by the map creation unit 103.

As illustrated in FIG. 7, first, the map creation unit 103 acquires, from the recognition unit 101, outside information that is a result of recognizing the outside (S201). Further, the map creation unit 103 acquires map specifications from the behavior planning unit 104 (S202). Note that the operation of Step S201 and the operation of Step S202 may be performed at the same time or in parallel.

Figure 8:
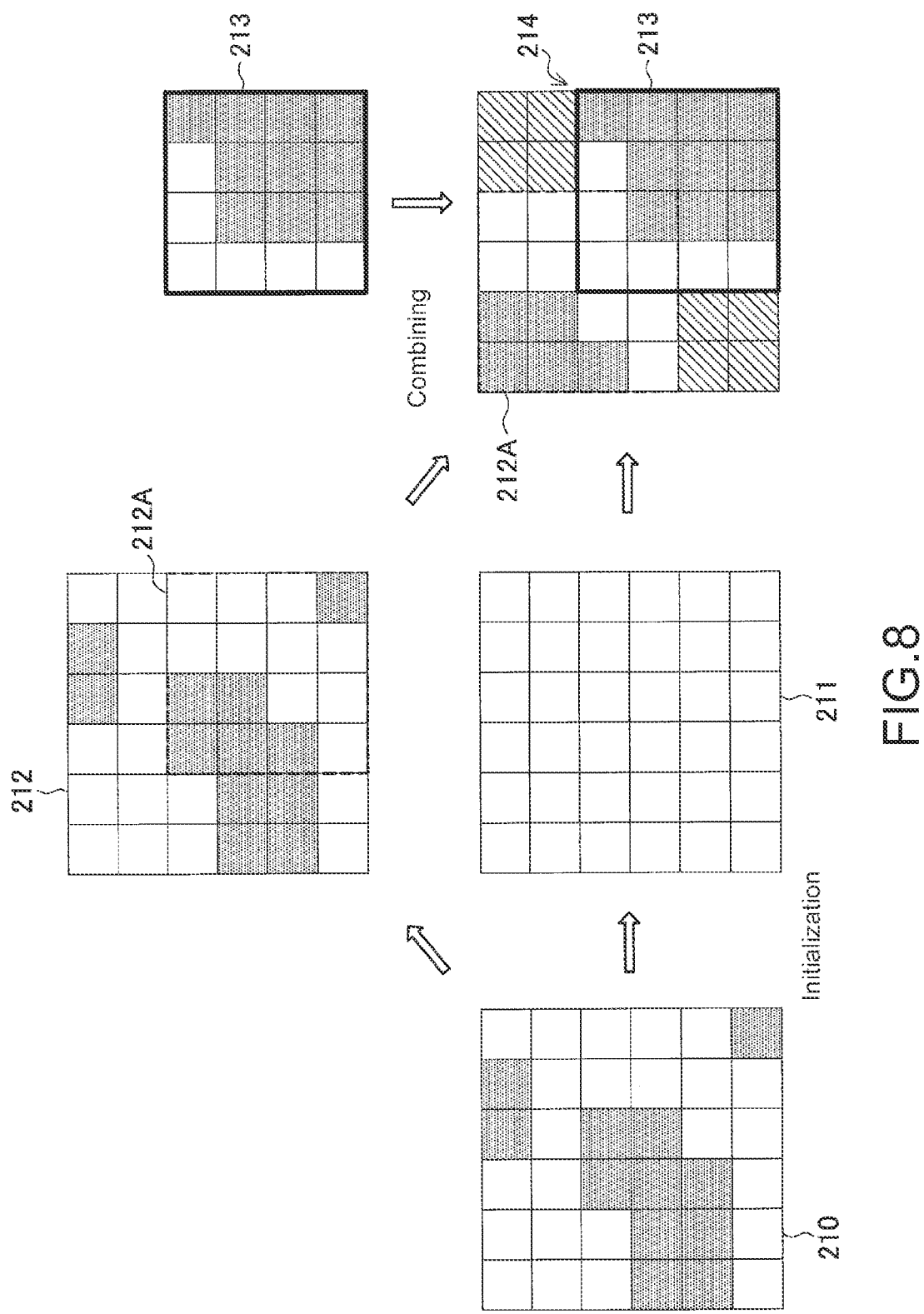
FIG. 8 is an illustration explaining the details of the creation of an outside map performed by the map creation unit.
Figure 9:
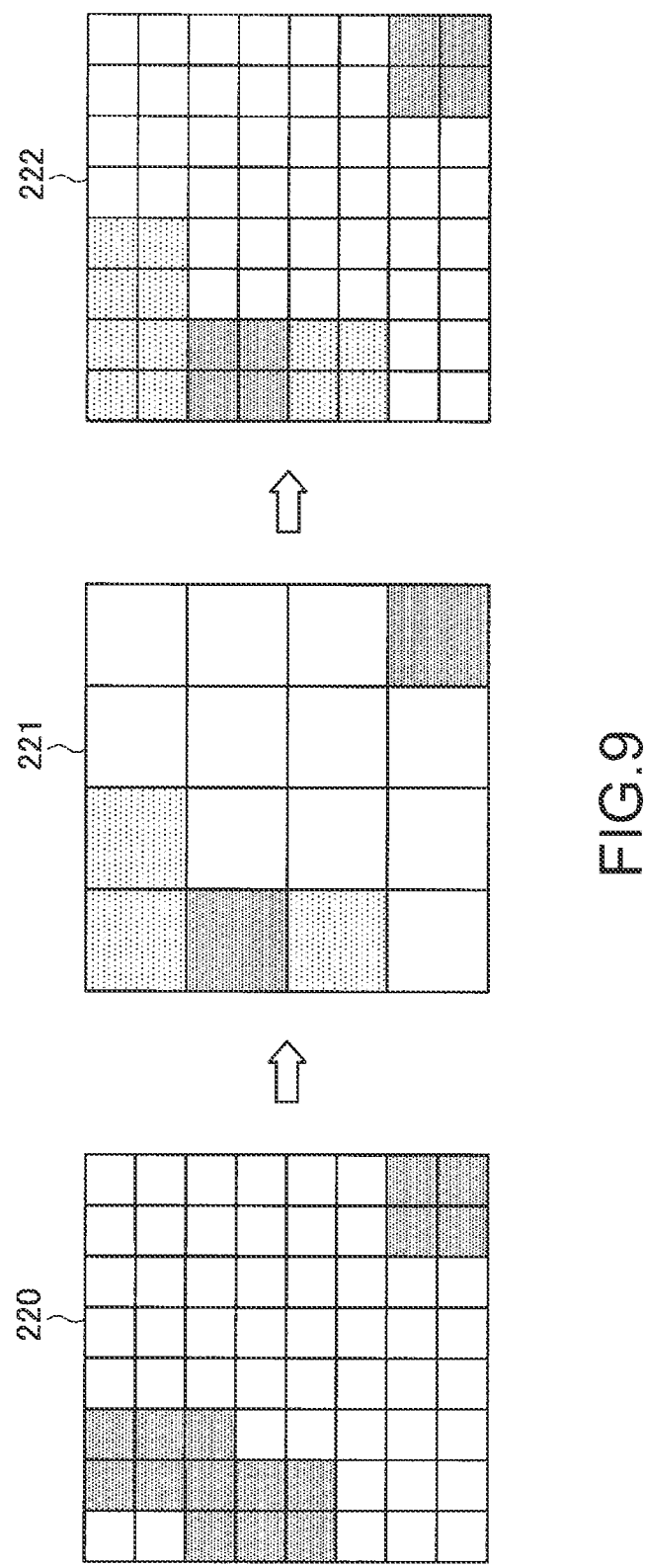
FIG. 9 is an illustration explaining the details of the creation of an outside map performed by the map creation unit.

Next, as illustrated in FIG. 8, the map creation unit 103 saves a previously created outside map 210 as a previous map 212 (S210).

Then, the map creation unit 103 initializes the outside map to create an inner map 211 based on the map specifications acquired from the behavior planning unit 104 (S220). For example, in the example illustrated in FIG. 8, the map creation unit 103 creates the inner map 211 in blank having a region and a resolution that are specified by the map specifications acquired from the behavior planning unit 104.

Next, the map creation unit 103 creates a local map 212A obtained by converting the previous map 212 such that the map specifications acquired from the behavior planning unit 104 are satisfied (S232). For example, in the example illustrated in FIG. 8, first, the map creation unit 103 extracts, from the previous map 212, a region included in a region specified by the updated map specifications. Then, the map creation unit 103 converts a coordinate system and a resolution of the extracted region such that the map specifications are specified, and performs a rotation conversion or a magnification and reduction conversion, so as to create the local map 212A.

Note that the map creation unit 103 may perform a process of forgetting the previous map 212 before the map creation unit 103 converts the previous map 212 to create the local map 212A. The process of forgetting the previous map 212 is a process of deleting, according to the timing of acquiring outside information, certain information from among information included in the previous map 212, in which a period of time equal to or more than a certain period of time has elapsed since acquisition of the certain information. This enables the map creation unit 103 to prevent old information from remaining in an outside map without the old information being updated.

Further, the map creation unit 103 creates a local map 213 using outside information that is a result of a recognition of the outside performed by the recognition unit 101, such that the map specifications are satisfied (S231). For example, in the example illustrated in FIG. 8, the map creation unit 103 creates, using the outside information, the local map 213 having a coordinate system and a resolution that satisfy the map specifications.

Note that the operation of Step S231 and the operation of Step S232 may be performed at the same time or in parallel.

Then, the map creation unit 103 combines the local maps 212A and 213 respectively created in Steps S232 and S231 to create an outside map 214 that satisfies the updated map specifications (S240). The created outside map 214 is output to the behavior planning unit 104 (S250).

For example, in the example illustrated in FIG. 8, the map creation unit 103 determines which of the local maps 212A and 213 corresponds to which region in the inner map 211, and causes the respective local maps 212A and 213 to overlap, so as to create the outside map 214. Note that, in the example illustrated in FIG. 8, the map creation unit 103 determines that a region without information is an unobserved region (a region marked using diagonal hatching in FIG. 8) since the region without information is excluded from the regions of the local maps 212A and 213.

The overlap of respective local maps may be performed by causing local maps to overlap in the reverse chronological order from a point in time at which outside information was most recently acquired. Specifically, the overlap of respective local maps may be performed by overwriting a local map created using older outside information with a local map created using newer outside information. In such a case, information acquired by performing observation in the past is replaced by information acquired by performing a newer observation, and thus the map creation unit 103 can create an outside map using newer information.

Further, the overlap of respective local maps may be performed by causing information for each local map to overlap in the form of probability. Specifically, the overlap of respective local maps may be performed by providing an indication regarding the presence or absence of an obstacle in each region for each local map, and by representing the existence of an obstacle in each region using probability. In such a case, the map creation unit 103 can create an outside map using information regarding a plurality of local maps, and thus can create an outside map having more highly reliable information. Note that the indication provided for each local map may be weighted according to the level of the reliability of outside information.

Note that FIG. 8 illustrates an example in which the resolution remains unchanged when the map creation unit 103 converts a previous map into a local map, but the technology according to an aspect of the present disclosure is not limited to this example. In the following description, an example in which the resolution is changed when a previous map is converted into a local map is described with reference to FIG. 9.

In FIG. 9, the level of the existence probability of an obstacle in each grid square is represented by shading using dot hatching. Specifically, a grid square without an obstacle is represented by not using dot hatching, and a grid square with a higher existence probability of an obstacle is represented by deeper shading using dot hatching.

As illustrated in FIG. 9, when a low-resolution map 221 is created by reducing the resolution of a high-resolution map 220, first, the map creation unit 103 derives an average of an obstacle region and a movable-across region of the high-resolution map 220 corresponding to each grid square of the low-resolution map 221 to be created. Then, the map creation unit 103 may set the derived average to be the existence probability of an obstacle in each grid square of the low-resolution map 221.

For example, when a grid square of the low-resolution map 221 is formed by four grid squares of the high-resolution map 220, and all of the four grid squares of the high-resolution map 220 are obstacle regions, the grid square of the low-resolution map 221 may be set to be an obstacle region in which the existence probability of an obstacle is 100%. Further, when two of the four grid squares of the high-resolution map 220 are obstacle regions, the grid square of the low-resolution map 221 may be set to be an obstacle region in which the existence probability of an obstacle is 50%. Furthermore, when one of the four grid squares of the high-resolution map 220 is an obstacle region, the grid square of the low-resolution map 221 may be set to be an obstacle region in which the existence probability of an obstacle is 25%.

Alternatively, the map creation unit 103 may set, to be the existence probability of an obstacle in a grid square of the low-resolution map 221, a result obtained by summing the indication of an obstacle region and summing the indication of a movable-across region of the high-resolution map 220 included in the grid square of the low-resolution map 221.

On the other hand, as illustrated in FIG. 9, when a high-resolution map 222 is created by increasing the resolution of the low-resolution map 221, first, the map creation unit 103 extracts the existence probability of an obstacle in a grid square of the low-resolution map 221 that corresponds to a grid square of the high-resolution map 222 to be created. Then, the map creation unit 103 may set the extracted existence probability of an obstacle to be the existence probability of an obstacle in the grid square of the high-resolution map 222.

For example, when four gird squares of the high-resolution map 222 are included in a grid square of the low-resolution map 221 and when the grid square of the low-resolution map 221 is an obstacle region, the four grid squares of the high-resolution map 222 may be respectively set to be obstacle regions. For example, when four gird squares of the high-resolution map 222 are included in a grid square of the low-resolution map 221 and when the grid square of the low-resolution map 221 is a movable-across region, the four grid squares of the high-resolution map 222 may be respectively set to be movable-across regions.

Alternatively, the map creation unit 103 may set, to be the existence probability of an obstacle, a value obtained by grid squares of the high-resolution map 222 sharing a result obtained by summing the indication of an obstacle region and summing the indication of a movable-across region in a grid square of the low-resolution map 221.

According to the example of the operation described above, the controller 100 according to an embodiment of the present disclosure can create, in the map creation unit 103, an outside map using map specifications created by the behavior planning unit 104. This enables the controller 100 according to an embodiment of the present disclosure to acquire an outside map more suitable for the content of a behavior plan to be created, which results in being able to create a behavior plan more efficiently.

<4. Modification>

Figure 10:
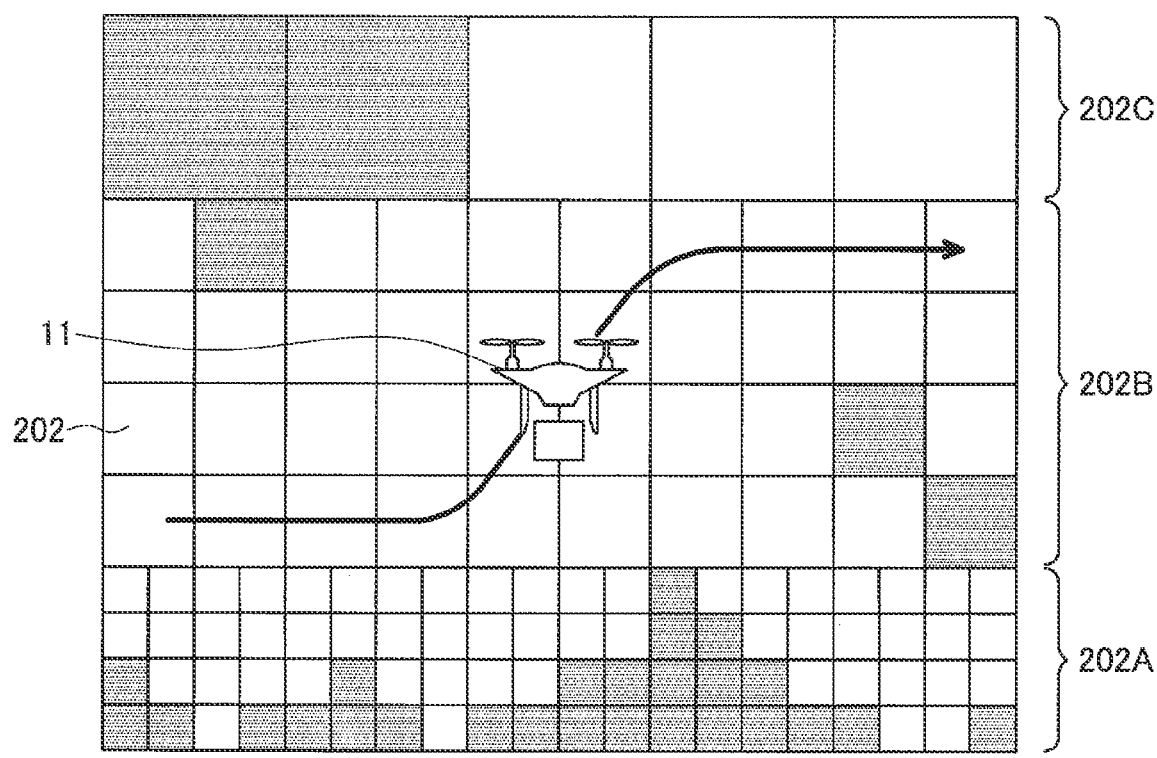
FIG. 10 is an illustration explaining an outline of a modification of the controller.

Next, an example of a modification of the controller 100 according to an embodiment of the present disclosure is described with reference to FIG. 10. FIG. 10 is an illustration explaining an outline of a modification of the controller 100.

As illustrated in FIG. 10, the controller 100 according to an embodiment of the present disclosure may be used to create a movement route of a flight vehicle 11, such as a drone, that moves in a three-dimensional space. Specifically, the controller 100 may create, in the map creation unit 103, an outside map 202 in which the resolution varies in parallel with an altitude direction, and may create a behavior plan to control the movement route of the flight vehicle 11 using the created outside map 202.

For example, the outside map 202 created by the map creation unit 103 may include a low-altitude region 202A, a medium-altitude region 202B, and a high-altitude region 202C that are arranged in the order from a region closer to the surface of the earth. The reason for this arrangement is that the number of obstacles in the air is expected to be increased toward the surface of the earth and is expected to be decreased at a higher altitude. Thus, the controller 100 makes it possible to reduce a data amount of the outside map 202 by reducing the resolution of a region situated far away from the surface of the earth.

As described above, when the controller 100 creates a behavior plan for the flight vehicle 11 moving in a three-dimensional space, an outside map may include information regarding the altitude direction. In such a case, the behavior planning unit 104 may additionally specify, in map specifications to be created, information regarding the altitude direction. For example, as described above, the behavior planning unit 104 may additionally specify, in map specifications to be created, a resolution for each altitude.

<5. Example of Configuration of Hardware>

Figure 11:
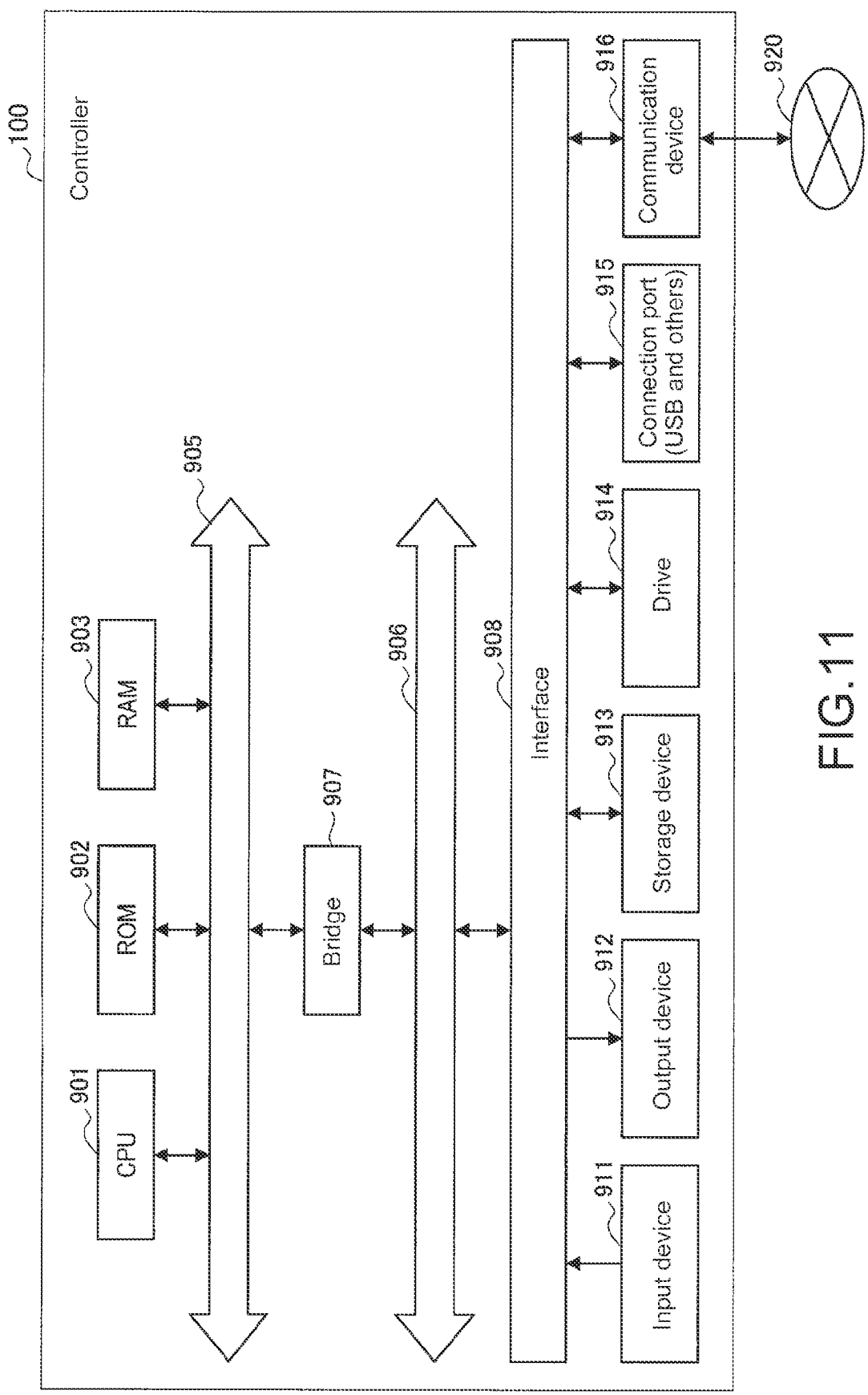
FIG. 11 is a block diagram of an example of a configuration of hardware of the controller according to an embodiment of the present disclosure.

Next, a configuration of hardware of the controller 100 according to an embodiment of the present disclosure is described with reference to FIG. 11. FIG. 11 is a block diagram of an example of a configuration of hardware of the controller 100 according to an embodiment of the present disclosure.

As illustrated in FIG. 11, the controller 100 includes a CPU (Central Processing Unit) 901, a ROM (Read Only Memory) 902, a RAM (Random Access Memory) 903, a bridge 907, internal buses 905 and 906, an interface 908, an input device 911, an output device 912, a storage device 913, a drive 914, a connection port 915, and a communication device 916.

The CPU 901 serves as an arithmetic processing unit, and controls an entire operation of the controller 100 in accordance with various programs stored in, for example, the ROM 902. The ROM 902 stores therein a program and an operational parameter that are used by the CPU 901, and the RAM 903 temporarily stores therein, for example, a program used for the execution of the CPU 901 and a parameter that varies in the execution as appropriate. For example, the CPU 901 may perform the functions of the recognition unit 101, the map creation unit 103, the planning-use-map creation unit 102, the behavior planning unit 104, the drive controller 105, and the motive generation unit 107.

The CPU 901, the ROM 902, and the RAM 903 are connected to one another through, for example, the bridge 907 and the internal buses 905 and 906. Further, the CPU 901, the ROM 902, and the RAM 903 are also connected to the input device 911, the output device 912, the storage device 913, the drive 914, the connection port 915, and the communication device 916 through the interface 908.

Examples of the input device 911 include input devices, such as a touch panel, a keyboard, a mouse, a button, a microphone, a switch, and a lever, that are used to input information. Further, an input control circuit used to generate an input signal using input information and perform output to the CPU 901 is also included as an example of the input device 911. For example, the input device 911 may perform the function of the input unit 106.

Examples of the output device 912 include display devices such as a CRT (Cathode Ray Tube) display device, a liquid crystal display device, and, an organic EL (Organic Electroluminescence) display device. Further, examples of the output device 912 may include sound output devices such as a speaker and a headphone.

The storage device 913 is a storage of the controller 100 used for data storage. Examples of the storage device 913 may include a storage medium, a storage used to store data in the storage medium, a read device that reads the data from the storage medium, and a deletion device that deletes the stored data.

The drive 914 is a reader for storage medium, and is provided within the controller 100 or externally provided to the controller 100. For example, the drive 914 reads information stored in an attached removable storage medium such as a magnetic disk, an optical disk, a magneto-optical disk, or a semiconductor memory, and outputs the read information to the RAM 903. The drive 914 is also capable of writing information into a removable storage medium.

For example, the connection port 915 is a connection interface constituted of a connection port, such as a USB (Universal Serial Bus) port, an Ethernet (registered trademark) port, an IEEE 802.11 standard port, or an optical audio terminal, that is used for a connection with external connection equipment.

For example, the communication device 916 is a communication interface constituted of, for example, a communication device used for a connection with a network 920. Further, the communication device 916 may be a wired-LAN-enabled communication device or a wireless-LAN-enabled communication device, or may be a cable communication device that performs a cable communication by wire.

Note that it is possible to create a computer program that causes a function to be performed with respect to the hardware provided within the controller 100 such as a CPU, a ROM, and a RAM, the function being equivalent to that of each element of the controller according to an embodiment of the present disclosure described above. Further, it is also possible to provide a storage medium having stored therein the computer program.

<6. Summary>

The controller 100 according to an embodiment of the present disclosure described above enables the map creation unit 103 to create, using map specifications created by the behavior planning unit 104, an outside map of an appropriate region that is used to create a behavior plan. Accordingly, the controller 100 makes it possible to reduce a data amount of and a calculation amount for an outside map.

Further, the controller 100 according to an embodiment of the present disclosure enables the map creation unit 103 to create an outside map with an appropriate degree of accuracy using map specifications created by the behavior planning unit 104. Accordingly, the controller 100 makes it possible to reduce a data amount of and a calculation amount for an outside map.

Furthermore, the controller 100 according to an embodiment of the present disclosure makes it possible to create a more appropriate outside map using map specifications created by the behavior planning unit 104, and thus the behavior planning unit 104 can create a behavior plan more suitable for a behavior objective.

Moreover, the controller 100 according to an embodiment of the present disclosure makes it possible to change map specifications of an outside map according to a change in a behavior objective or a state of the robotic device 10. Accordingly, the controller 100 makes it possible to maintain the optimality of an outside map according to the content of a behavior of the robotic device 10.

The embodiments of the present disclosure have been described above in detail with reference to the drawings, but the technical scope of the present disclosure is not limited to the examples described above. It is clear that a person who has common knowledge in the technical field of the present disclosure could conceive of various modifications or alterations within the scope of the technical ideas in the claims, and it should be understood that of course such modifications and alterations also belong to the technical scope of the present disclosure.

Further, the effects described herein are not limitative, but are merely descriptive or illustrative. In other words, in addition to, or instead of the effects described above, the technology according to an aspect of the present disclosure could provide other effects apparent to those skilled in the art from the descriptions herein.

Note that the following configurations also belong to the technical scope of the present disclosure.

(1) A controller including:
  a map creation unit that creates an outside map using outside information; and
  a behavior planning unit that creates a behavior plan for a robotic device using the outside map, in which
  the map creation unit creates the outside map using map specifications created by the behavior planning unit.

(2) The controller according to (1), in which
  the behavior planning unit creates the map specifications using at least one of a behavior objective of the robotic device that is to be achieved using the behavior plan, or a state of the robotic device.

(3) The controller according to any one of (1) or (2), in which
  the behavior planning unit creates the map specifications specifying at least one of a region or a resolution of the outside map.

(4) The controller according to any one of (1) to (3), in which
  the region of the outside map is specified such that the region of the outside map includes an initial position and a target position of the robotic device in the behavior objective.

(5) The controller according to any one of (1) to (4), in which
  the resolution of the outside map is specified using at least one of a movement speed or a movement accuracy of the robotic device.

(6) The controller according to any one of (1) to (5), in which the resolution of the outside map is specified using a size of the region of the outside map.
(7) The controller according to any one of (1) to (6), in which
the behavior planning unit creates the map specifications before the behavior planning unit specifies specification of the outside information used to create the outside map.
(8) The controller according to any one of (1) to (7), in which
when the robotic device is a flight vehicle, the behavior planning unit creates the map specifications specifying a resolution of the outside map for each altitude.
(9) The controller according to any one of (1) to (8), in which
when the behavior objective or the state of the robotic device is updated, the behavior planning unit updates the map specifications.
(10) The controller according to any one of (1) to (9), in which
when the behavior planning unit updates the map specifications, the behavior planning unit determines whether the outside map created before the update of the map specifications satisfies the updated map specifications.
(11) The controller according to any one of (1) to (10), in which
when the outside map created before the update of the map specifications does not satisfy the updated map specifications, the map creation unit changes the outside map created before the update of the map specifications such that the updated map specifications are satisfied.
(12) The controller according to any one of (1) to (11), in which
when the map creation unit changes the outside map created before the update of the map specifications, the map creation unit deletes information based on the outside information from the changed outside map, in which a specified period of time has elapsed since acquisition of the outside information.
(13) The controller according to any one of (1) to (12), in which
the map creation unit creates the outside map satisfying the updated map specifications by combining an outside map changed to satisfy the updated map specifications, and an outside map newly created using the outside information.
(14) The controller according to any one of (1) to (13), in which the outside map includes a plurality of regions having different resolutions.
(15) A control method including:
creating, by an arithmetic processing unit, an outside map using outside information; and
creating, by the arithmetic processing unit, a behavior plan for a robotic device using the outside map, in which
the outside map is created using map specifications created to create the behavior plan.
(16) A program that
causes a computer to serve as:
a map creation unit that creates an outside map using outside information; and
a behavior planning unit that creates a behavior plan for a robotic device using the outside map, and causes the map creation unit to create the outside map using map specifications created by the behavior planning unit.
(17) An information processing apparatus including:
circuitry configured to:
generate a map specification based on a behavior objective of a mobility device or a state of the mobility device; and
create, based on the generated map specification, an outside map of an environment external to the mobility device that satisfies the generated map specification.
(18) The information processing apparatus according to (17), wherein the behavior objective includes a movement destination of the mobility device.
(19) The information processing apparatus according to any one of (17) or (18), wherein the state of the mobility device includes a position state, a motion state, a battery state, or a failure state of the mobility device.
(20) The information processing apparatus according to any one of (17) to (19), wherein the circuitry is further configured to:
create a behavior plan based on the outside map to achieve the behavior objective.
(21) The information processing apparatus according to any one of (17) to (20), wherein the behavior plan controls a movement of the mobility device.
(22) The information processing apparatus according to any one of (17) to (21), wherein the behavior objective includes a movement destination of the mobility device, and
wherein the behavior plan includes a shortest path from a position of the mobility device to the movement destination.
(23) The information processing apparatus according to any one of (17) to (22), wherein the map specification includes a size of a region of the outside map and a resolution of the outside map.
(24) The information processing apparatus according to any one of (17) to (23), wherein the behavior objective includes a movement destination of the mobility device, and
wherein the resolution of the outside map is specified based on an accuracy of the movement destination.
(25) The information processing apparatus according to any one of (17) to (24), wherein the resolution of the outside map varies in parallel with an altitude direction.
(26) The information processing apparatus according to any one of (17) to (25), wherein the state of the mobility device includes a speed of the mobility device, and
wherein the circuitry is further configured to:
generate, when the speed of the mobility device is a first level, the map specification including the size of the region of the outside map to be a second level; and
generate, when the speed of the mobility device is a third level higher than the first level, the map specification including the size of the region of the outside map to be a fourth level higher than the second level.
(27) The information processing apparatus according to any one of (17) to (26), wherein the state of the mobility device includes a speed of the mobility device, and
wherein the circuitry is further configured to:

generate, when the speed of the mobility device is a first level, the map specification including the resolution of the outside map to be a second level; and generate, when the speed of the mobility device is a third level higher than the first level, the map specification including the resolution of the outside map to be a fourth level lower than the second level.

(28) The information processing apparatus according to any one of (17) to (27), wherein the mobility device is a mobile robot.

(29) The information processing apparatus according to any one of (17) to (28), wherein the mobility device is a flight vehicle.

(30) The information processing apparatus according to any one of (17) to (29), wherein the circuitry is further configured to:
acquire a previous outside map;
determine whether the previous outside map satisfies the map specification; and
create the outside map based on a determination that the previous outside map does not satisfy the map specification.

(31) The information processing apparatus according to any one of (17) to (30), wherein the circuitry is further configured to:
create a behavior plan based on the previous outside map to achieve the behavior objective, based on a determination that the previous outside map satisfies the map specification.

(32) The information processing apparatus according to any one of (17) to (31), wherein the circuitry is further configured to:
acquire outside information;
create, based on the outside information, a first local map that satisfies the map specification;
create, based on the previous outside map, a second local map that satisfies the map specification; and
combine the first local map and the second local map to create the outside map.

(33) The information processing apparatus according to any one of (17) to (32), wherein the circuitry is further configured to:
create an inner map based on the map specification;
determine which regions of the first local map and the second local map correspond to respective regions in the inner map; and
create the outside map by overlapping the first local map and the second local map based on the determination.

(34) The information processing apparatus according to any one of (17) to (33), wherein the inner map is blank and including a region and a resolution that are specified by the map specification.

(35) An information processing method including:
generating a map specification based on a behavior objective of a mobility device or a state of the mobility device; and
creating, based on the generated map specification, an outside map of an environment external to the mobility device that satisfies the generated map specification.

(36) A non-transitory computer-readable recoding medium having embodied thereon a program, which when executed by a computer causes the computer to execute a method, the method including:
generating a map specification based on a behavior objective of a mobility device or a state of the mobility device; and
creating, based on the generated map specification, an outside map of an environment external to the mobility device that satisfies the generated map specification.

REFERENCE SIGNS LIST

10 Robotic device
100 Controller
101 Recognition unit
102 Planning-use-map creation unit
103 Map creation unit
104 Behavior planning unit
105 Drive controller
106 Input unit
107 Motive generation unit
110 Sensor
120 Drive unit

The invention claimed is:

1. An information processing apparatus comprising: circuitry configured to:
generate a map specification based on a behavior objective of a mobility device or a state of the mobility device; and
create, based on the generated map specification, an outside map of an environment external to the mobility device that satisfies the generated map specification,
wherein the map specification includes a size of a region of the outside map and a resolution of the outside map, and
wherein the circuitry is further configured to:
generate, based on the state of the mobility device being a first level, the map specification including the size or the resolution of the region of the outside map to be a second level; and
generate, based on the state of the mobility device being a third level different than the first level, the map specification including the size or the resolution of the region of the outside map to be a fourth level different than the second level.

2. The information processing apparatus of claim 1, wherein the behavior objective includes a movement destination of the mobility device.

3. The information processing apparatus of claim 1, wherein the state of the mobility device includes a position state, a motion state, a battery state, or a failure state of the mobility device.

4. The information processing apparatus of claim 1, wherein the circuitry is further configured to:
create a behavior plan based on the outside map to achieve the behavior objective.

5. The information processing apparatus of claim 4, wherein the behavior plan controls a movement of the mobility device.

6. The information processing apparatus of claim 4, wherein the behavior objective includes a movement destination of the mobility device, and
wherein the behavior plan includes a shortest path from a position of the mobility device to the movement destination.

7. The information processing apparatus of claim 1, wherein the behavior objective includes a movement destination of the mobility device, and wherein the resolution of the outside map is specified based on an accuracy of the movement destination.

8. The information processing apparatus of claim 1, wherein the resolution of the outside map varies in parallel with an altitude direction.

9. The information processing apparatus of claim 1, wherein the mobility device is a mobile robot.

10. The information processing apparatus of claim 1, wherein the mobility device is a flight vehicle.

11. The information processing apparatus of claim 1, wherein the circuitry is further configured to:
acquire a previous outside map;
determine whether the previous outside map satisfies the map specification; and
create the outside map based on a determination that the previous outside map does not satisfy the map specification.

12. The information processing apparatus of claim 11, wherein the circuitry is further configured to:
create a behavior plan based on the previous outside map to achieve the behavior objective, based on a determination that the previous outside map satisfies the map specification.

13. The information processing apparatus of claim 11, wherein the circuitry is further configured to:
acquire outside information;
create, based on the outside information, a first local map that satisfies the map specification;
create, based on the previous outside map, a second local map that satisfies the map specification; and
combine the first local map and the second local map to create the outside map.

14. The information processing apparatus of claim 13, wherein the circuitry is further configured to:
create an inner map based on the map specification;
determine which regions of the first local map and the second local map correspond to respective regions in the inner map; and
create the outside map by overlapping the first local map and the second local map based on the determination.

15. The information processing apparatus of claim 14, wherein the inner map is blank and including a region and a resolution that are specified by the map specification.

16. An information processing apparatus comprising:
circuitry configured to:
generate a map specification based on a behavior objective of a mobility device or a state of the mobility device; and
create, based on the generated map specification, an outside map of an environment external to the mobility device that satisfies the generated map specification,
wherein the map specification includes a size of a region of the outside map and a resolution of the outside map,
wherein the state of the mobility device includes a speed of the mobility device, and
wherein the circuitry is further configured to:
generate, when the speed of the mobility device is a first level, the map specification including the size of the region of the outside map to be a second level; and
generate, when the speed of the mobility device is a third level higher than the first level, the map specification including the size of the region of the outside map to be a fourth level higher than the second level.

17. An information processing apparatus comprising:
circuitry configured to:
generate a map specification based on a behavior objective of a mobility device or a state of the mobility device; and
create, based on the generated map specification, an outside map of an environment external to the mobility device that satisfies the generated map specification,
wherein the map specification includes a size of a region of the outside map and a resolution of the outside map,
wherein the state of the mobility device includes a speed of the mobility device, and
wherein the circuitry is further configured to:
generate, when the speed of the mobility device is a first level, the map specification including the resolution of the outside map to be a second level; and
generate, when the speed of the mobility device is a third level higher than the first level, the map specification including the resolution of the outside map to be a fourth level lower than the second level.

18. An information processing method comprising:
generating a map specification based on a behavior objective of a mobility device or a state of the mobility device;
creating, based on the generated map specification, an outside map of an environment external to the mobility device that satisfies the generated map specification,
wherein the map specification includes a size of a region of the outside map and a resolution of the outside map;
generating, based on the state of the mobility device being a first level, the map specification including the size or the resolution of the region of the outside map to be a second level; and
generating, based on the state of the mobility device being a third level different than the first level, the map specification including the size or the resolution of the region of the outside map to be a fourth level different than the second level.

19. A non-transitory computer-readable recoding medium having embodied thereon a program, which when executed by a computer causes the computer to execute a method, the method comprising:
generating a map specification based on a behavior objective of a mobility device or a state of the mobility device;
creating, based on the generated map specification, an outside map of an environment external to the mobility device that satisfies the generated map specification,
wherein the map specification includes a size of a region of the outside map and a resolution of the outside map;
generating, based on the state of the mobility device being a first level, the map specification including the size or the resolution of the region of the outside map to be a second level; and
generating, based on the state of the mobility device being a third level different than the first level, the map specification including the size or the resolution of the region of the outside map to be a fourth level different than the second level.

* * * * *